March 21, 1933.  F. F. ANDERSEN  1,901,862
PNEUMATIC TIRE
Filed Nov. 16, 1932
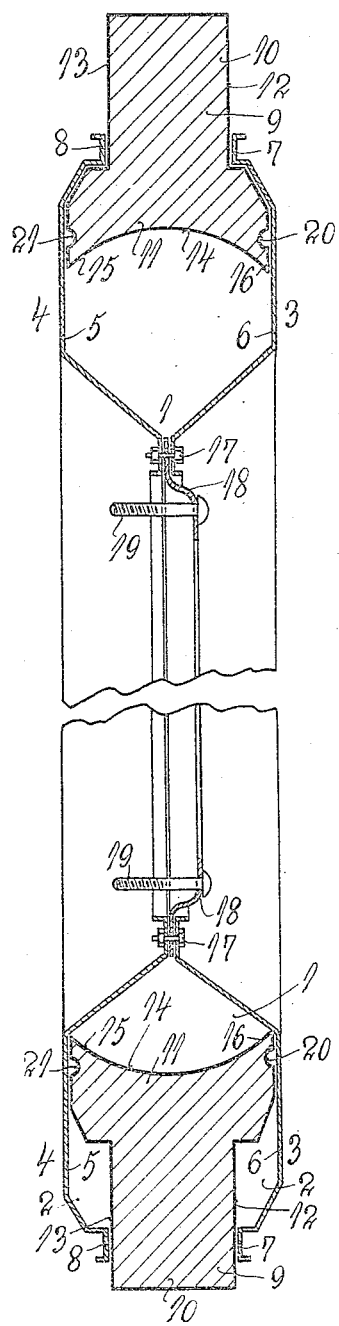
Inventor:
F. F. Andersen;
By
His Attorneys.

Patented Mar. 21, 1933

1,901,862

UNITED STATES PATENT OFFICE

FELIX FRIDTJOV ANDERSEN, OF OSLO, NORWAY

PNEUMATIC TIRE

Application filed November 16, 1932, Serial No. 642,826, and in Sweden May 30, 1931.

The present invention relates to improvements in pneumatic tires of the well known type, where the wheel is surrounded by an annular air chamber, built up of stiff material and where the road pressure is transmitted to the air chamber by means of an outer tread or wearing surface, which is in connection with a ringformed piston arranged in and having airtight sliding contact with the sides of the said annular air chamber.

A preferred type of this wheel is arranged in such a way that when the piston is made to move in radial direction, a combined action of compression and vacuum will take the load, due to the fact that the means which transmits the pressure from the surface of the tread to the said piston has sliding airtight fit in a suitable aperature in the periphery of the chamber, as for instance described in U. S. Patent No. 1,854,537.

Previously known wheels of this type have, however, had the disadvantage of being rather complicated in their construction, and the main object of this invention is to provide a wheel of the above mentioned type which will be very simple and inexpensive in manufacture and reliable in operation.

In fact the wheel according to this invention consists of three parts only, viz. a rubber shoe, which combines the tread and the said piston and two entirely similar metal plates, which—when assembled—form the said annular air chamber.

The present invention thus consists in a pneumatic tire, comprising an annular air chamber with rigid side walls and a ringformed flexible piston, arranged for radial movement with airtight sliding contact in the said chamber between the side walls of same, a rubber tread or wearing surface, arranged around the periphery of the said chamber and being made in one piece with the said piston, said chamber being assembled from two corresponding stiff metal plates, having parallel even surfaces, registering with the sides of the said piston and having radially extending inbent flanges with plane parallel surfaces, adapted to form airtight sliding contact with the side surfaces of the connecting member between the said outer tread and the said piston.

In order that the invention shall be readily understood, it will in the following be described with reference to the drawing, which in a cross section illustrates a preferred embodiment of the same.

In the drawing, the pressure-and vacuum chambers 1 and 2 are assembled from two pressed plates 3 and 4, which have plane parallel sides 5 and 6 and inbent flanges 7 and 8, the sides of the said flanges also being formed of plane parallel plates. The tread of the tire consists in a rubber ring 9, having a rectangular section 10 and a wider section 11, the latter forming a ring-formed elastic piston. The dimensioning of the rectangular part 10 is such that the outer sides 12 and 13 will have airtight sliding contact with the sides of the inbent flanges 7, 8, extending from the plates 3 and 4.

On the inside, the ringformed piston 11 has a convex form as shown at 14, in such a way that the side edges 15 and 16 extend inwardly in radial direction, forming tongues which under the influence of the pressure in the pressure chamber 1 will be forced against the parallel sides 5 and 6 and thereby securing airtight connection with these. The side plates 3 and 4 may at the inner edge be connected with each other by means of bolts 17, and if it is desired, a ringformed plate 18 may be placed in between the sides 3 and 4 and be attached to this by means of the same bolts 17. The ringformed plate 18 may by means of bolts 19 be attached to the usual automobile wheel.

In order to ensure that the wheel according to the present invention shall function in a satisfactory way, it is necessary that a friction reducing medium is introduced between the sliding members. For this purpose, one may use glycerine, which has the property of practically reducing the friction between rubber and metal to zero at the same time as it evaporates very slowly and has the ability of penetrating through quite small openings. In order to facilitate the distribution of the glycerine around the side edges and to ensure that the glycerine shall penetrate all the way up to the insides of the flanges 7 and 8, lubricating grooves 20 and 21 may be arranged in a suitable way in the sides of the ringformed piston 11.

When the tread 9 due to the weight of the car is forced in radial direction as illustrated in the lower part of the drawing, an overpressure will be established in the pressure chamber 1, and this overpressure will further tend to force the tongues 15 and 16 into perfect airtight connection with the side walls 3 and 4.

At the same time a vacuum will be established in the chamber 2, and this will effect that the flanges 7 and 8 will be forced against the sides 12 and 13 of the rectangular part of the tire 9. The airtight fit between the flanges 7 and 8 and the sides of the rectangular part of the tire will further be ensured, due to the fact that the tire will be compressed to some extent, which again will tend to expand the same in transverse direction.

I claim

1. A pneumatic tire including two halves, each of which has a straight intermediate portion and end portions lying to one side of the plane of the straight intermediate portion, said halves being assembled with their intermediate straight portions parallel to form an annular air chamber having an inner closed end and an opening between the outer ends of the halves, and an annular member fitting between said halves, said annular member having an outer tread portion extending outwardly between and beyond the open outer ends of said halves and forming an air-tight fit therewith, said member also having an inner piston-portion making an air-tight fit with the straight parallel sides of said halves whereby the chamber formed by said halves is divided by said piston portion into an inner annular compression chamber and an outer vacuum chamber.

2. A pneumatic tire according to claim 1 in which the inner side of the piston portion of the annular member is outwardly convex, and in which the sides of said member which engage the parallel side walls of the annular chamber are provided near their inner edges with annular grooves.

In testimony whereof I have signed my name unto this specification.

FELIX FRIDTJOV ANDERSEN.